US006827183B1

United States Patent
Polcuch

(10) Patent No.: US 6,827,183 B1
(45) Date of Patent: Dec. 7, 2004

(54) SKEWED ROLLER BRAKE ASSEMBLY

(75) Inventor: Eric A. Polcuch, San Pedro, CA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 10/648,900

(22) Filed: Aug. 27, 2003

(51) Int. Cl.$^7$ ............................................... F16H 27/02
(52) U.S. Cl. ................... 188/134; 188/71.3; 192/223.3; 192/934
(58) Field of Search ............................... 188/134, 71.3; 192/223.3, 934

(56) References Cited

U.S. PATENT DOCUMENTS

| | | | | |
|---|---|---|---|---|
| 4,176,733 A | * | 12/1979 | Twickler | 188/134 |
| 4,346,793 A | * | 8/1982 | Fuse et al. | 188/134 |
| 4,860,869 A | * | 8/1989 | Hall, III | 192/223.3 |
| 5,299,676 A | * | 4/1994 | Wade | 192/223.3 |
| 6,109,415 A | * | 8/2000 | Morgan et al. | 192/223.1 |

* cited by examiner

Primary Examiner—Matthew C. Graham

(74) Attorney, Agent, or Firm—Phillips Lytle LLP

(57) ABSTRACT

A skewed roller brake assembly (20) has a main axis of rotation (x—x), has a first plate (21) adapted to be rotated about the main axis, has a second plate (22) adapted to be rotated relative to the first plate about the main axis, and has an intermediate plate (23) positioned between the first and second plates. The first and second plates are adapted to be axially loaded with respect to one another. The intermediate plate has a plurality of slots (25). Each slot is bounded by a first wall (26) that is arranged at a first angle ($\theta_1$) with respect to a radius from the main axis. A cylindrical roller (25) is arranged in each slot for rolling engagement with the first and second plates about the axis of the roller such that the roller axis (y—y) is parallel to the first wall when the first and second plates are rotated relative to one another in one angular direction. The slot has a second wall (28) arranged at a second angle ($\theta_2$) with respect to a radius from the main axis such that the roller axis is parallel to the second wall when the first and second plates are rotated relative to one another in the opposite angular direction. The resistance to relative rotation between the first and second plates for the same value of axial loading may differ as a function of the direction of relative angular rotation between the first and second plates.

8 Claims, 1 Drawing Sheet

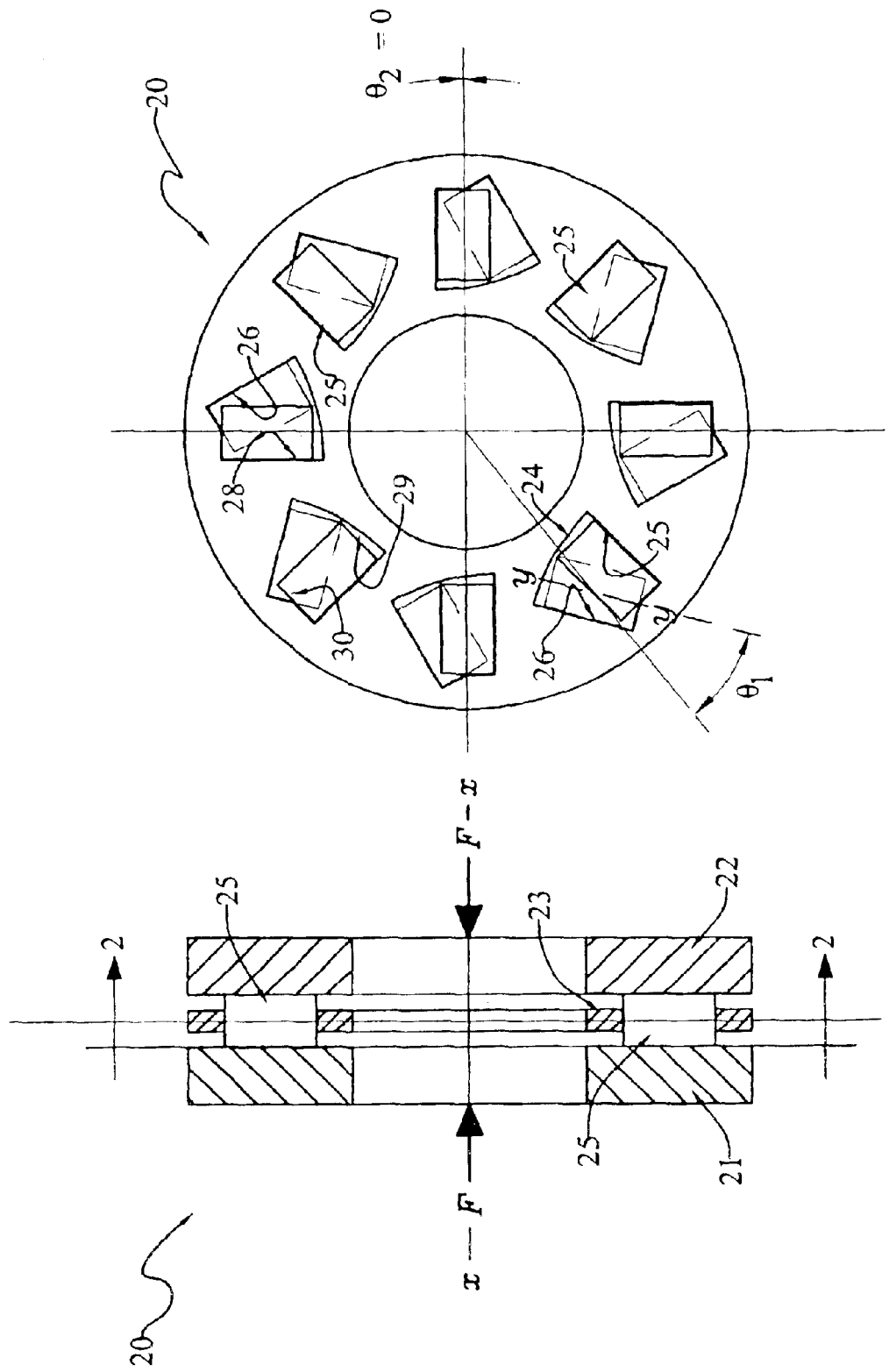

SKEWED ROLLER BRAKE ASSEMBLY

TECHNICAL FIELD

The present invention relates generally to the field of skewed roller brake assemblies, and, more particularly, to an improved skewed roller brake assembly that allows different braking characteristics depending upon the direction of relative rotation between facing first and second plates.

BACKGROUND ART

Skewed roller brake assemblies are known as a class of rotary braking devices which develop friction between a pair of relatively-rotating axially-loaded disks by means of rollers carried in a slotted plate between the disks. The slots containing the rollers are arranged at a skew angle relative to radii from the center of rotation so that, as the rollers roll between the disks, they tend to track inwardly or outwardly on the disk surfaces. However, the rollers are constrained to maintain a constant radius about the centerline of the brake, causing an axial sliding along the line of rolling contact. This combination of rolling and sliding contact has the desirable property of lending to equalize breakout and running friction, thereby avoiding erratic brake behavior.

Basically, these devices generally contemplate that a plurality of rollers, arranged in a circular array, be disposed between two facing annular plates. The rollers are restrained in slots provided in an intermediate plate positioned between the first and second plates. In known prior art forms, the intermediate plate slots are generally rectangular, and are arranged to closely embrace the roller therewithin. Thus, the skew angle of the roller axis is substantially the same regardless of the direction of relative rotation between the plates.

Specific details of such known prior art skewed roller brake assemblies are representatively shown and described in U.S. Pat. Nos. 4,850,458 and 6,109,415, the aggregate disclosures of which are hereby incorporated by reference. In some applications of skewed roller brake elements, it is desirable to produce one value of braking coefficient in one direction of relative rotation, and another value (possibly approaching zero) in the opposite direction. This could be achieved by means of different braking elements, coupled through over-running clutches or opposed ratchets, such as shown in the aforesaid U.S. Pat. No. 6,109,415.

The present invention offers the desirable property of providing differing coefficients of braking friction inherent in the braking assembly as a function of the direction of relative rotation, without the need for additional clutches or ratchets.

DISCLOSURE OF THE INVENTION

The present invention provides an improvement in a skewed roller brake assembly (20). Such a brake assembly has a main axis of rotation (x—x), has a first plate (21) adapted to be rotated about the main axis, has a second plate (22) adapted to be rotated relative to the first plate about the main axis, and has an intermediate plate (23) positioned between the first and second plates and also arranged to rotate about the main axis. The first and second plates are adapted to be axially loaded by a braking force F—F with respect to one another. The intermediate plate has a slot (24) bounded by a first wall (26) that is arranged at a first angle $\theta_1$ with respect to a radius from the main axis, and has a cylindrical roller (25) arranged in the slot for rolling engagement with the first and second plates about the axis (y—y) of the roller such that the roller axis is parallel to the first wall when the first and second plates are rotated relative to one another in one angular direction. The improvement broadly comprises; the slot having a second wall (28) arranged at a second angle ($\theta_2$) with respect to a radius from the main axis such that the roller axis is substantially parallel to the second wall when the first and second plates are rotated relative to one another in the opposite angular direction; whereby the resistance to relative rotation between the first and second plates for the same value of axially loading may differ as a function of the direction of relative angular rotation between the first and second plates.

In the preferred embodiment, the second wall is substantially parallel to a radius from the main axis. The roller is mounted in the slot for movement between the first and second walls. The intermediate plate may have a plurality of such slots, and the assembly may include a corresponding plurality of such rollers, with one of the rollers being arranged in one of the slots. Each roller is restrained from moving axially by the end faces of the slots when the roller axis is parallel to either the first wall or to the second wall.

Accordingly, the general object of the invention is to provide an improved skewed roller brake assembly.

Another object is to provide an improved skewed roller brake assembly which affords different degrees of rolling resistance depending upon the direction of relative angular rotation between two facing plates.

These and other objects and advantages will become apparent from the foregoing and ongoing written specification, the drawings, and the appended claims.

BRIEF DESCRIPTION OF THE DRAWINGS

FIG. 1 is a fragmentary side elevation of the improved skewed roller brake assembly, this view showing the first plate, the intermediate slotted plate, and the second plate, the main axis of rotation, and an axial force on the plates.

FIG. 2 is a fragmentary longitudinal vertical sectional view thereof, taken generally on line 2—2 of FIG. 1, showing the intermediate plate in elevation, and particularly depicting the plurality of rollers as being arranged in the corresponding plurality of slots.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, the present invention provides an improved skewed roller brake assembly, of which a presently preferred embodiment is generally indicated at 20. In FIG. 1, this brake assembly is shown as having a horizontal main axis of rotation x—x. It has a first plate 21 adapted to be rotated by suitable means (not shown) about the main axis, has a second plate 22 also adapted to be selectively rotated by suitable means (not shown) relative to the first plate about the main-axis (x—x), and also has an intermediate slotted plate 23 positioned between the first and second plates. These three plates may be regarded as having annular vertical surfaces arranged in spaced facing relation. The first and second plates are adapted to be axially loaded with respect to one another, as indicated by the arrows F—F in FIG. 1. In other words, a suitable force would be applied to urge these two plates to move toward one another.

The intermediate plate 23 has at least one slot, generally indicated at 24, and has a cylindrical roller 25 arranged in the slot. In practice, the intermediate plate has a plurality of such slots, there being eight of same shown in FIG. 2, with a corresponding plurality of rollers, one in each slot. Each slot is bounded by a first wall 26, a second wall 28, an inner wall 29, and an outer wall 30. The first and second walls may be planar, as shown. The skew angle θ of a slot wall is defined as the angle between the axis y—y of a roller driving against the wall and a radius from axis x—x passing through the mid point of the roller axis. In this regard, the first wall is skewed at an angle of $\theta_1$ with respect to a radial line from the main axis of rotation. The second wall is skewed at an angular of $\theta_2$ from the main axis of rotation. The inner wall 29 is shown as being a concave arcuate surface. The outer wall 30 is shown as being a concave polygonal surface.

The various rollers are freely movable within in their respective slots. Hence, when the plates are moved in one relative angular direction, the rollers may move to a position such that the roller axis y—y will be positioned parallel to the first wall 26. Conversely, when the two plates are rotated relative to one another in the opposite relative angular direction, the rollers may move to alternative positions at which the roller axes y—y are parallel to the second walls.

By configuring the slots, the extent of braking may be varied as a function of the direction of relative rotation between plates 21, 22. In other words, the two skew angles may be different such that the degree of braking torque will be correspondingly different, depending upon the direction of relative rotation. If one of the walls has a skew angle of zero, the axial sliding friction force component will be directed through the brake rotation axis, and hence will produce no braking torque.

Modifications

The present invention contemplates that many changes and modifications may be made. First, the number of rollers and slots in the intermediate plate may be readily varied. The specific configuration of each slot may also be varied, as well as the shape and configuration of the cylindrical rollers. The first and second walls of the slots may be arranged and configured so as to afford the same or different skew angles, thereby to change the braking force as a function of the direction of relative rotation. The skew angle may be 0°, if desired. To minimize sources of friction other than axial skidding of the roller, the roller may be formed with a crowned end, or some other end shape, to reduce contact with the end of the slot. Alternatively the roller may be formed of a stack of disks interleaved with polytetrafluoroethylene (i.e., Teflon®) washers on an axle rod to reduce skidding due to the difference in radius about the center of rotation from one end of the slot to the other.

Therefore, while the presently-preferred form of the improved skewed roller brake assembly has been shown and described, and several modifications thereof discussed, persons skilled in this art will readily appreciate that various additional changes and modifications may be made without departing from the spirit of the invention, as defined and differentiated by the following claims.

What is claimed is:

1. In a skewed roller brake assembly having a main axis of rotation, having a first plate adapted to be rotated about said main axis, having a second plate adapted to be rotated relative to said first plate about said main axis, and having an intermediate plate adapted to be rotated about said main axis and positioned between said first and second plates, said first and second plates being adapted to be axially loaded with respect to one another, said intermediate plate having a slot bounded by a first wall that is arranged at a first skew angle with respect to a radius from said main axis, and having a cylindrical roller arranged in said slot for rolling engagement with said first and second plates about the axis of said roller such that said roller axis will be urged toward a position parallel to said first wall when said first and second plates are rotated relative to one another in one angular direction, the improvement which comprises:

said slot having a second wall opposed but not parallel to said first wall and arranged at a second skew angle with respect to a radius from said main axis such that said roller axis will be urged toward a position parallel to said second wall when said first and second plates are rotated relative to one another in the opposite angular direction;

whereby the frictional resistance to relative rotation between said first and second plates determined by the skew angle of said roller axis for the same value of axial loading will change between a first value and a second value a& the direction of relative angular rotation between said first and second plates is reversed.

2. The improvement as set forth in claim 1 wherein said second wall is substantially parallel to a radius from said main axis such that the frictional resistance to relative rotation between said first and second plates in said opposite angular direction will be minimized.

3. The improvement as set forth in claim 1 wherein said roller is constrained in said slot for rolling movement between said first and second walls.

4. The improvement as set forth in claim 1 wherein said intermediate plate has a plurality of said slots, and wherein said assembly includes a corresponding plurality of said rollers, with one of said rollers being operatively arranged in a respective one of said slots.

5. The improvement as set forth in claim 1 wherein said roller is axially restrained at a substantially constant radius from said main axis when said roller axis is parallel to said first wall.

6. The improvement as set forth in claim 5 wherein said roller is axially restrained at said constant radius when said roller axis is parallel to said second wall.

7. A skewed roller brake assembly having a main axis of rotation, comprising:

a first plate adapted to be rotated about said main axis;

a second plate adapted to be rotated relative to said first plate about said main axis, said first and second plates being adapted to be axially loaded with respect to one another;

an intermediate plate positioned between said first and second plates and adapted to be rotated about said main axis, said intermediate plate having a slot bounded by a first wall and an opposed but non-parallel second wall; and a cylindrical roller loosely contained in said slot for rolling engagement with said first and second plates about the axis of said roller, said roller being adapted to move to a position such that said roller axis will be substantially parallel to said slot first wall when said first and second plates are rotated in one relative angular direction and adapted to move to a position such that said roller axis will be substantially parallel to said slot second wall when said first and second plates are rotated in the opposite relative angular direction;

whereby the frictional resistance to relative rotation between said first and second plates determined by the skew angle of said roller axis with respect to a radius from said main axis for the same value of axial loading will change between a first value and a second value as the direction of relative angular rotation between said first and second plates is reversed.

8. A skewed roller brake assembly having a main axis of rotation, comprising:

a first plate adapted to be rotated about said main axis;

a second plate adapted to be rotated relative to said first plate about said main axis, said first and second plates being adapted to be axially loaded with respect to one another; and a cylindrical roller positioned between said first and second plates for rolling engagement therewith about the axis of said roller, said roller being constrained to move between a first position at which said roller axis will be at a first skew angle with respect to a radius from said main axis when said plates are relatively rotated in one angular direction and a second position at which said roller axis will be at a second skew angle with respect to said radius when said plates are relatively rotated in the opposite angular direction, said first and second skew angles being substantially different;

whereby the frictional resistance to relative rotation of said first and second plates determined by the skew angle of said roller axis for the same value of axial loading will change between a first value and a second value as the direction of relative angular rotation between said first and second plates is reversed.

* * * * *